United States Patent
Boday et al.

(10) Patent No.: US 9,296,863 B2
(45) Date of Patent: *Mar. 29, 2016

(54) PREPARATION OF POLY(OCTATRIAZACANE)

(71) Applicant: International Business Machines Corporation, Armonk, NY (US)

(72) Inventors: Dylan J. Boday, Tucson, AZ (US); Jeannette M. Garcia, San Jose, CA (US); James L. Hedrick, Pleasanton, CA (US); Rudy J. Wojtecki, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/305,648

(22) Filed: Jun. 16, 2014

(65) Prior Publication Data

US 2015/0361221 A1    Dec. 17, 2015

(51) Int. Cl.
| | |
|---|---|
| *C08L 61/00* | (2006.01) |
| *C08G 73/06* | (2006.01) |
| *C09D 179/04* | (2006.01) |
| *C08L 61/32* | (2006.01) |

(52) U.S. Cl.
CPC ............... *C08G 73/06* (2013.01); *C08L 61/00* (2013.01); *C08L 61/32* (2013.01); *C09D 179/04* (2013.01)

(58) Field of Classification Search
CPC ................................ C08L 61/00; C08L 61/32
USPC ....................................................... 528/266
See application file for complete search history.

(56) References Cited

U.S. PATENT DOCUMENTS

| | | |
|---|---|---|
| 2,889,277 A | 6/1959 | Hughes |
| 3,340,232 A | 9/1967 | Smith et al. |
| 3,598,748 A | 8/1971 | Hirosawa |
| 3,957,742 A | 5/1976 | Kveton |

(Continued)

FOREIGN PATENT DOCUMENTS

| | | |
|---|---|---|
| CN | 101265255 A | 9/2008 |
| EP | 2636697 A1 | 9/2013 |

(Continued)

OTHER PUBLICATIONS

Scifinder Substructure results. No Author. Search performed on Feb. 26, 2015.*

(Continued)

*Primary Examiner* — Michael A Salvitti
(74) *Attorney, Agent, or Firm* — Patterson & Sheridan, LLP

(57) ABSTRACT

A polyoctatriazacane molecule is disclosed that has a plurality of octatriazacane groups having the structure

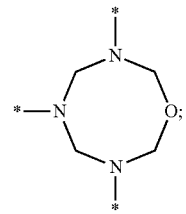

and a plurality of divalent bridging groups, each divalent bridging group comprising an aromatic group.

10 Claims, 1 Drawing Sheet

(56) References Cited

U.S. PATENT DOCUMENTS

| | | | |
|---|---|---|---|
| 4,106,904 A | 8/1978 | Oude Alink et al. | |
| 4,224,417 A | 9/1980 | Hajek et al. | |
| 4,225,481 A | 9/1980 | Wagner | |
| 4,246,160 A | 1/1981 | Wagner et al. | |
| 4,301,262 A | 11/1981 | Wagner et al. | |
| 4,342,687 A | 8/1982 | Zimmerman et al. | |
| 4,877,451 A | 10/1989 | Winnik et al. | |
| 5,112,796 A | 5/1992 | Iannicelli | |
| 5,674,377 A | 10/1997 | Sullivan, III et al. | |
| 5,830,243 A | 11/1998 | Wolak et al. | |
| 7,384,434 B2 | 6/2008 | Malfer et al. | |
| 8,470,812 B2 * | 6/2013 | Yang et al. | 514/219 |
| 2010/0107476 A1 | 5/2010 | Cosimbescu | |
| 2011/0166127 A1 * | 7/2011 | Yang et al. | 514/219 |
| 2011/0251114 A1 | 10/2011 | Lange et al. | |
| 2012/0049308 A1 | 3/2012 | Nishimura et al. | |

FOREIGN PATENT DOCUMENTS

| | | |
|---|---|---|
| GB | 928112 A | 6/1963 |
| GB | 1531578 A | 11/1978 |
| WO | 0166614 A2 | 9/2001 |
| WO | 0198388 A1 | 12/2001 |
| WO | 0226849 A1 | 4/2002 |

OTHER PUBLICATIONS

Scifinder Search results. No Author. Search performed on Feb. 26, 2015.*
Scifinder summary of Kakanejadifard et al. Asian Journal of Chemistry, vol. 20 issue 6 pp. 4706-4712, 2008.*
Henri Ulrich et al., Reaction of Chloromethyl Ether with Primary Amines, May 1961, pp. 1637-1638.
Hemant S. Patel et al., Studies on Synthesis and Characterization of some Novel Aromatic Copolyesters based on s-Triazine, Iranian Polymer Journal, vol. 14, No. 12, 2005, pp. 1090-1098.
Fabian Suriano et al., Functionalized cyclic carbonates: from synthesis and metal-free catalyzed ring-opening polymerization to applications, Polymer Chemistry, The Royal Society of Chemistry, 2011, Received Jul. 6, 2010, Accepted Aug. 13, 2010, pp. 528-533.
Wang Yulan et al., Synthesis and Porperties of Poly-1, 3, 5-Triazines, Polymer Communications, No. 2, 1984, pp. 117-123.
John Markoff, Error at IBM Lap Finds New Family of Materials, New York Times, May 15, 2014, 4 pages.
Jeanette M. Garcia et al., Recyclable, Strong Thermosets and Organogels via Paraformaldehyde Condensation with Diamines, Science AAAS, vol. 344, May 16, 2014, pp. 732-735.
D.R. Anderson et al., Thermally resistance polymers containing the s-triazine ring, Journal of Polymer Science Part A-1: Polymer Chemistry, vol. 4, Issue 7, pp. 1689-1702.
T. Okita, Filter method for the determination of trace quantities of amines, mercaptans, and organic sulphides in the atmosphere, Atmospheric Environment (1967), vol. 4, Issue 1, Jan. 1970, pp. 93-102.
Raquel Lebrero et al., Odor abatement in biotrickling filters: Effect of the EBRT on methyl mercaptan and hydrophobic VOCs removal, Bioresource Technology, Special Issue: Innovative Researches on Algal Biomass, vol. 109, Apr. 2012, pp. 38-45.
Elbert, et al. "Conjugate Addition Reactions Combined with Free-Radical Cross-Linking for the Design of Materials for Tissue Engineering," Biomacromolecules 2001, 2, 430-441; Published on Web Mar. 3, 2001.
Ferrar, "Reactions of Formaldehyde With Aromatic Amines," J. Appl. Chem, 14, 1964, 389-399.
Geng, et al., "Nanoindentation behavior of ultrathin polymeric films," Polymer 46 (2005) 11768-11772; Available online Oct. 19, 2005.
Hiller, et al., "Laser-engravable hexahydrotriazine polymer networks," Mat Res Innovat (2002) 6:179-184.
Oliver, et al., "Measurement of hardness and elastic modulus by; instrumented indentation: Advances in understanding and; refinements to methodology," J. Mater. Res., vol. 19, No. 1, Jan. 2004, 3-20.
Singh, et al., "Ultrasound mediated Green Synthesis of Hexa-hydro Triazines," J. Mater. Environ. Sci. 2 (4) (2011) 403-406.
Stafford, et al., "A buckling-based metrology for measuring; the elastic moduli of polymeric thin films," Nature Materials_Aug. 3, 2004, 545-550;Published online: Jul. 11, 2004.
Scifinder Summary Kakanejadifard et al. From Asian Journal of Chemistry, vol. 20, Issue 6, pp. 4706-4712 (2008).
List of IBM patents or Patent Applications Treated as Related.
Ghandi et al. "Novel Reaction of N,N'—Bisarylmethanediamines with Formaldehyde. Synthesis of Some New 1,3,5-Triaryl-1,3,5-hexahydrotriazines", Molecules 2006, vol. 11, pp. 556-563. Abstract; p. 557, Scheme 1.
Search Report and Written Opinion mailed on Sep. 3, 2015 in corresponding International Application No. PCT/US15/036063, 7 pages.

* cited by examiner

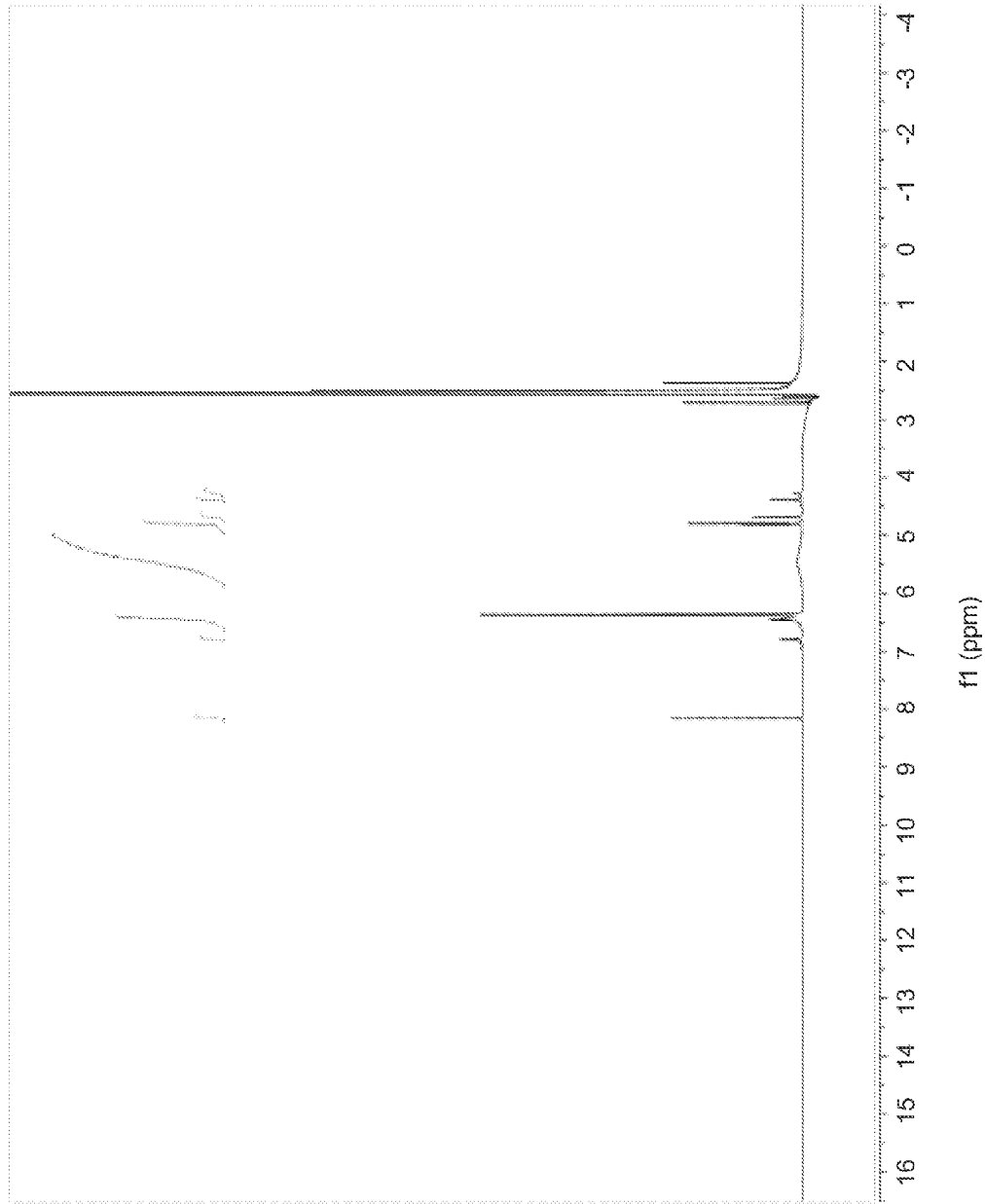

PREPARATION OF POLY(OCTATRIAZACANE)

BACKGROUND

The present disclosure relates to methods of making poly(octatriazacane) materials.

New polymer-forming reactions are difficult to design due to strict requirements for efficient, straight-forward, and clean chemistry. Small molecule octatriazacanes have been synthesized previously but have never been explored as a potential polymer-forming reaction. A new and simple polymer forming polycondensation of diamines with paraformaldehyde to poly(hexahydrotriazine)s and poly(hemiaminal)s has been previously described.

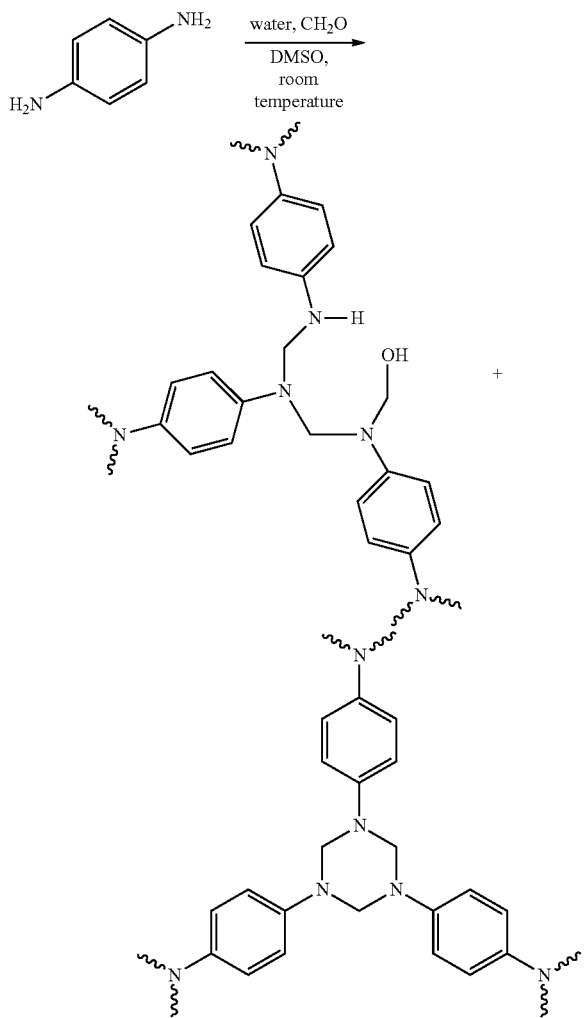

These poly(hexahydrotriazine)s exhibited high Young's modulus (~14.0 GPa for the freestanding films) but are completely amorphous and generally lack free volume within their polymer matrix due to their high crosslink density. Additionally, these polymers suffer from poor yield strength and solubility and electron-deficient monomers do not react to form polymer according to this reaction scheme. Therefore, polymers that are structurally similar to the poly(hexahydrotriazine)s and poly(hemiaminal)s but having improved yield strength and solubility and which might incorporate electron-deficient monomers would be of interest.

A need exists for methods of making new polymers having improved properties and better performance in the areas described above.

SUMMARY

According to one embodiment, a polyoctatriazacane is a molecule having a plurality of octatriazacane groups having the structure

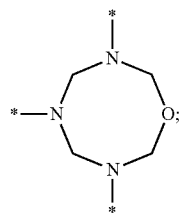

and a plurality of divalent bridging groups, each divalent bridging group comprising an aromatic group. Each divalent bridging group may have the general structure

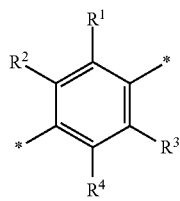

wherein $R^1$, $R^2$, $R^3$, and $R^4$ are each, individually, H, Cl, CN, F, $NO_2$, $SO_3$, heterocycles such as imides, benzoxazoles, benzimidazoles, phenylquinoxalines, $C_xH_{2x+1-y}R^5_y$, or $C_6H_{5-a}R^5_a$, wherein $R^5$ is Cl, F, $SO_3$, $C_6H_{5-a}R^6_a$, or $NH_{3-b}R^6_b$, wherein $R^6$ is $C_xH_{2x+1}$, $C_xH_{2x}$, or $C_6H_5$, where in each instance x is an integer from 1 to 4, y is an integer from 0 to 2x+1, a is an integer from 0 to 5, and b is an integer from 0 to 3; or the general structure wherein L' is a divalent linking group selected from the group consisting of *—$SO_2$—*, *—N(R')—*, *—N(H)—*, *—$CF_2$—*, *—$C(CF_3)_2$—*, *—R"—*, and combinations thereof, wherein R' and R" independently comprise at least 1 carbon.

According to another embodiment, a method of forming a polyoctatriazacane may include forming a reaction mixture comprising a i) solvent, ii) a formaldehyde, and iii) a monomer comprising two primary aromatic amine groups; and forming a polyoctatriazacane by adding formic acid to the reaction mixture. In one embodiment, p-phenylenedianiline is reacted with paraformaldehyde and formic acid in DMSO to produce poly-N,N,N-(p-phenylenedianiline)-octatriazacane.

The above-described embodiments and other features and advantages of the present disclosure will be appreciated and understood by those skilled in the art from the following detailed description, drawings, and appended claims

BRIEF DESCRIPTION OF THE SEVERAL VIEWS OF THE DRAWINGS

FIG. 1 is a $^1$H-NMR analysis of a polyoctatriazacane according to one embodiment.

DETAILED DESCRIPTION

Methods of making polyoctatriazacanes are described. Polyoctatriazacanes have the general structure

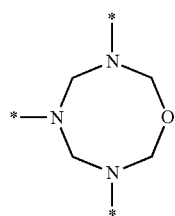
(1)

A plurality of trivalent octatriazacane groups are bonded, at the starred bonds, to divalent linking groups having the general structure *—K'—*, where K' comprises an aromatic group. A polyoctatriazacane according to formula (1) may be made by mixing together a diamine, or a mixture of diamines, having the general structure $H_2N$—K'—$NH_2$, where K' is defined as above, with an aldehyde (i.e. formaldehyde, paraformaldehyde, acetaldehyde, benzaldehyde, etc.), a solvent, and formic acid.

K' may be a substituted or unsubstituted phenylene group having the general structure of formula (2):

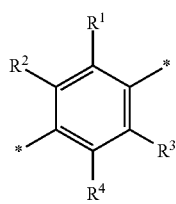
(2)

where $R^1$, $R^2$, $R^3$, and $R^4$ are each, individually, H, Cl, CN, F, $NO_2$, $SO_3$, heterocycles such as imides, benzoxazoles, benzimidazoles, and phenylquinoxalines, $C_xH_{2x+1-y}R^5_y$, or $C_6H_{5-a}R^5_a$, where $R^5$ is Cl, F, $SO_3$, $C_6H_{5-a}R^6_a$, or $NH_{3-b}R^6_b$, where $R^6$ is $C_xH_{2x+1}$, $C_xH_{2x}$, or $C_6H_5$, where in each instance x is an integer from 1 to 4, y is an integer from 0 to 2x+1, a is an integer from 0 to 5, and b is an integer from 0 to 3. Thus, in addition to an aromatic group, K' may have fluorine, chlorine, or sulfonate groups. Exemplary diamine reactants of this type include phenylene diamine, a fluoromethyl phenylene diamine such as a phenylene diamine in the para or meta configuration with one to four fluoromethyl groups, each of which may have one to three fluorine atoms, an alkyl fluoromethyl phenylene diamine with a mixture of alkyl and fluoromethyl substituents, or a phenylene triamine with no more than one amino group having substituents, may also be used. For example, tetrakis-(2,3,5,6-trifluoromethyl)-1,4-diamino benzene, bis-(2,5-trifluoromethyl)-1,4-diamino benzene, or 2-fluoromethyl-bis-(3,5-difluoromethyl)-1,4-diamino benzene may be used.

K' may also be a polynuclear aromatic group, such as a naphthalene group, an acenaphthene group, an acenaphthylene group, a fluorene group, a phenalene group, or an anthracene group, any of which may be substituted at any non-amino carbon atom with substituted or unsubstituted alkyl or aryl groups or halogens, or may be partially saturated (e.g. dialin, tetralin groups). K' may also be a substituted or unsubstituted indene, indane, or indole group.

K' may also be a phenyl containing group having the general structure of formula (3)

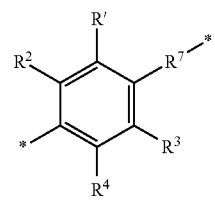
(3)

where $R^7$ is a substituted or unsubstituted alkyl, aryl, or polyaromatic group, any of which may be substituted at any non-amino carbon atom with a substituted or unsubstituted alkyl or aryl group, or a halogen. Thus, $R^7$ may be $SO_2$, $C_xH_{2x-y}R^5_y$, or $C_6H_{5-a}R^5_a$, with x, y, and a defined as above.

K' may also be a diphenyl group having the formula (4):

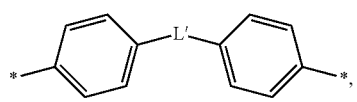
(4)

wherein L' is a divalent linking group selected from the group consisting of *—$SO_2$—*, *—N(R')—*, *—N(H)—*, *—$CF_2$—*, *—$C(CF_3)_2$—*, *—R"—*, and combinations thereof, wherein R' and R" independently comprise at least 1 carbon. In an embodiment, R' and R" are independently selected from the group consisting of methyl, ethyl, propyl, isopropyl, phenyl, and combinations thereof. For example, L' may be a linear hydrocarbyl group having from 1 to 4 carbon atoms. Other L' groups include methylene (*—$CH_2$—*), isopropylindenyl (*—$C(Me)_2$-*), and fluorenylidenyl:

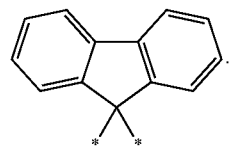 [SMILES: *C1(*)c2ccccc2-c2ccccc21]

A phenylenedianiline such as p-phenylenedianiline may be used as a diamine reactant. A polyoctatriazacane may have a mixture of linking groups of formula (1) and formula (2).

In an embodiment, a polyoctatriazacane is a crosslinked polymer comprising i) a plurality of trivalent octatriazacane groups of formula (1) covalently linked to ii) a plurality of divalent bridging groups K' according to the descriptions of K' above. Each starred bond of a given octatriazacane group of formula (1) is covalently linked to a respective one of the bridging groups K'. Additionally, each starred bond of a given bridging group K' is covalently linked to a respective one of the octatriazacane groups.

Exemplary non-limiting divalent bridging groups include:

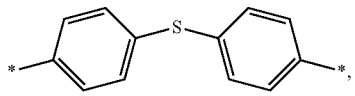

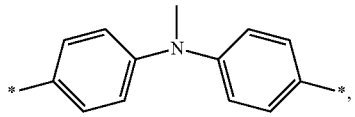

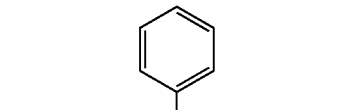

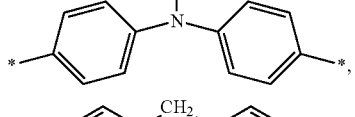

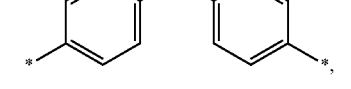

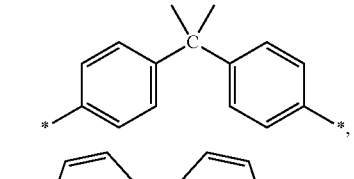

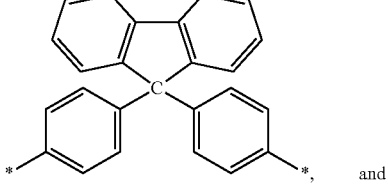, and combinations thereof.

The polyoctatriazacanes described herein can further comprise monovalent aromatic groups (referred to herein as diluent groups), which do not participate in chemical crosslinking and therefore can serve to control the crosslink density as well as the physical and mechanical properties of the polyoctatriazacane polymers. Monovalent diluent groups have a structure according to formula (5), formula (6), formula (7), and/or formula (8):

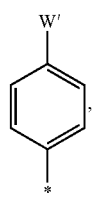 (5)

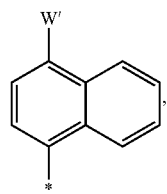 (6)

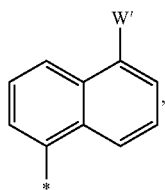 (7)

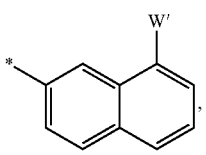 (8)

wherein W' is a monovalent radical selected from the group consisting of *—N(R$^1$)(R$^2$), *—CF$_2$—*, *C(CF$_3$)$_2$—*, *—OR$^3$, —SR$^4$, wherein R$^1$, R$^2$, R$^3$, and R$^4$ are independent monovalent radicals comprising at least 1 carbon. The starred bond is linked to a nitrogen of an octatriazacane group.

Non-limiting exemplary diluent groups include:

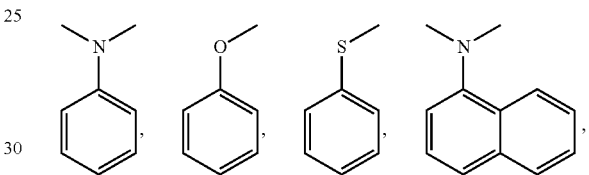

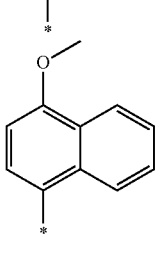 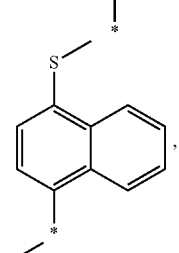

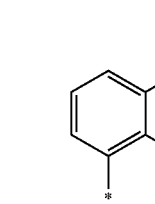 , and 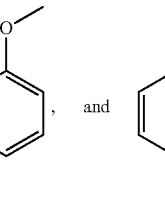 , wherein the starred bond is linked to a nitrogen of an octatriazacane group. Diluent groups can be used singularly or in combination.

A method of preparing a polyoctatriazacane comprising divalent bridging groups comprises forming a mixture comprising i) a monomer comprising two or more primary aromatic amine groups, ii) an optional diluent monomer comprising one aromatic primary amine group, iii) an aldehyde, and iv) a solvent. The mixture is stirred while formic acid is added. Any aldehyde may be used, such as formaldehyde, paraformaldehyde, acetaldehyde, benzaldehyde, or the like. The equivalence ratio of aldehyde to total moles of primary aromatic amine groups (e.g., diamine monomer plus optional monoamine monomer) is preferably about 1:1 to about 1.25:1. Formic acid is generally added in sub-stoichiometric quantities, such as less than 0.8 equivalents, between about 0.1 equivalents and about 0.5 equivalents, for example about 0.5 equivalents.

Non-limiting exemplary monomers comprising two primary aromatic amine groups include 4,4'-methylenedianiline (MDA), 4,4'-(9-fluorenylidene)dianiline (FDA), p-phenylenediamine (PD), 1,5-diaminonaphthalene (15DAN), 1,4-diaminonaphthalene (14DAN), and benzidene, which have the following structures:

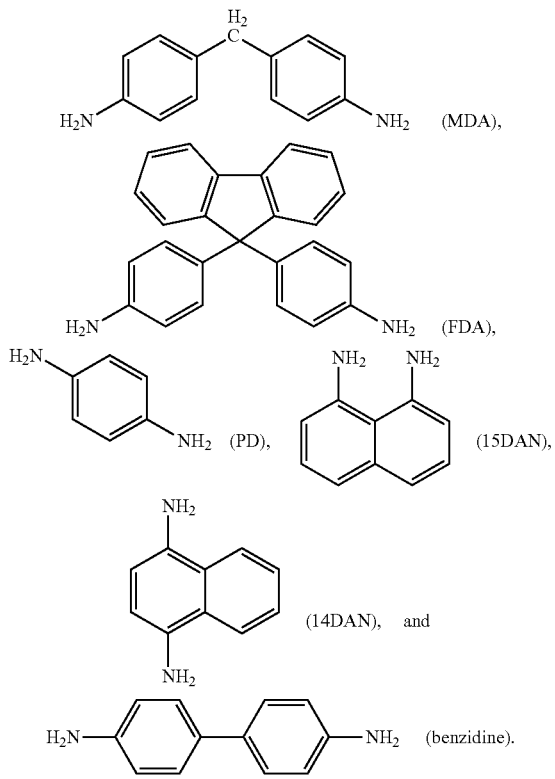

Non-limiting exemplary diluent monomers include N,N-dimethyl-p-phenylenediamine (DPD), p-methoxyaniline (MOA), p-(methylthio)aniline (MTA), N,N-dimethyl-1,5-diaminonaphthalene (15DMN), N,N-dimethyl-1,4-diaminonaphthalene (14DMN), and N,N-dimethylbenzidene (DMB), which have the following structures:

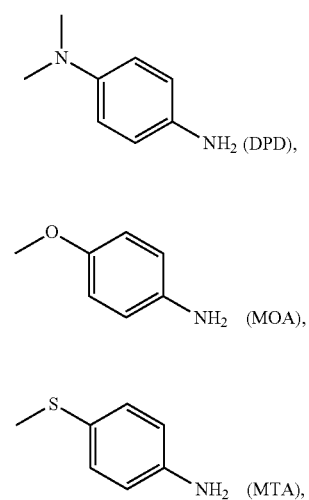

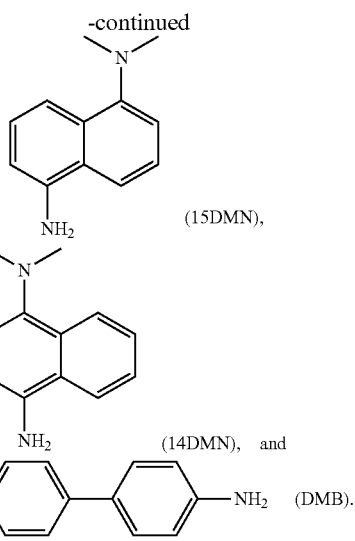

The diluent monomer can be used in an amount of 0 mole % to about 75 mole % based on total moles of monomer and diluent monomer.

The solvent can be any suitable solvent. Preferred solvents include dipolar aprotic solvents such as, for example, N-methyl-2-pyrrolidone (NMP), dimethylsulfoxide (DMSO), N,N-dimethylformamide (DMF), N,N-dimethylacetamide (DMA), Propylene carbonate (PC), and propylene glycol methyl ether acetate (PGMEA).

A polyoctatriazacane as described herein may be coated onto a substrate by forming a first mixture comprising i) a monomer comprising two aromatic primary amine groups, ii) an optional diluent monomer comprising one aromatic primary amine group, iii) an aldehyde, and iv) a solvent, coating the mixture on the substrate to form a precursor layer, and then distributing formic acid over the precursor layer to form a polyoctatriazacane coating. The substrate can be any structurally strong substrate, such as a semiconductor wafer (e.g., silicon wafer), most metals, refractory materials, and other polymers. Any suitable coating technique (e.g., spin coating, dip coating, roll coating, spray coating, and the like) may be used. An adhesive bond may be formed in some cases if the first mixture is allowed to, or able to, penetrate into the surface of the substrate before reacting with the formic acid.

In this context, a substrate may be, without limitation, an electronic device, microchip, microelectronic device, printed circuit board, hard disk drive platter, a portion of fluid filter, and portion of a hydrocarbon (e.g., petroleum, natural gas, or petro-chemical) processing facility such as a pipe, pipeline, fluid pumping device, distillation column, a reaction vessel, or storage tank.

The number average molecular weight (Mn) of a polyoctatriazacane can be in a range of 1000 to 100,000, preferably in a range of 1000 to 50,000, and most preferably in a range of 1000 to 20,000.

In one example, 0.050 g of p-phenylenedianiline (0.462 mmol, 1.0 equivalents, purchased from Sigma-Aldrich Co., LLC, of St. Louis, Mo. and stored under nitrogen) and 0.0277 g paraformaldehyde (0.924 mmol, 2.0 equivalents, washed with water, acetone, the diethyl ether, then dried over $P_2O_5$ prior to use) were combined in a dried vial with stirbar in a nitrogen-filled glovebox with 0.5 mL of dry DMSO (refluxed over $CaH_2$ for 96 hours prior and then distilled prior to use). Formic acid, 0.004 g, was then added by syringe to the solution (0.231 mmol, 0.5 equivalents). After 10 minutes, an aliquot of the resulting orange solution was taken for ¹H-NMR analysis. FIG. 1 shows the resulting trace, which is consistent with the following reaction scheme:

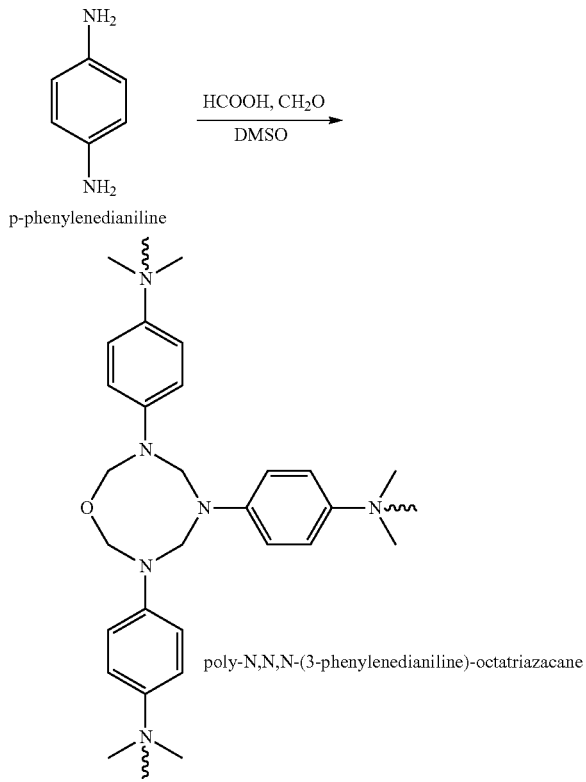

While the foregoing is directed to embodiments of the present invention, other and further embodiments of the invention may be devised without departing from the basic scope thereof, and the scope thereof is determined by the claims that follow.

What is claimed is:

1. A polyoctatriazacane, comprising:
a plurality of octatriazacane groups having the structure

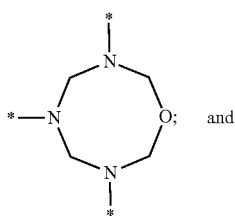 [SMILES: *N1COCN(*)CN(*)C1 ; "and"]

a plurality of divalent bridging groups, each divalent bridging group comprising an aromatic group, wherein each divalent bridging group is covalently bonded to an octatriazacane group at one of the starred bonds.

2. The polyoctatriazacane of claim 1, wherein at least one of the divalent bridging groups has the general structure

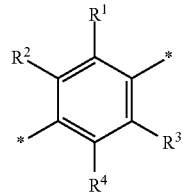

wherein $R^1$, $R^2$, $R^3$, and $R^4$ are each, individually, H, Cl, CN, F, $NO_2$, $SO_3$, imides, benzoxazoles, benzimidazoles, phenylquinoxalines, $C_xH_{2x+1-y}R^5_y$, or $C_6H_{5-a}R^5_a$, wherein $R^5$ is Cl, F, $SO_3$, $C_6H_{5-a}R^6_a$, or $NH_{3-b}R^6_b$, wherein $R^6$ is $C_xH_{2x+1}$, $C_xH_{2x}$, or $C_6H_5$, where in each instance x is an integer from 1 to 4, y is an integer from 0 to 2x+1, a is an integer from 0 to 5, and b is an integer from 0 to 3.

3. The polyoctatriazacane of claim 1, wherein at least one of the divalent bridging groups has the general structure

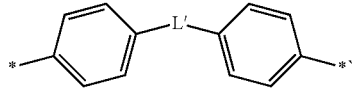

wherein L' is a divalent linking group selected from the group consisting of $-SO_2-$, $-N(R')-$, $-N(H)-$, $-CF_2-$, $-C(CF_3)_2-$, $-R''-$, and combinations thereof, wherein R' and R'' independently comprise at least 1 carbon.

4. The polyoctatriazacane of claim 3, wherein the at least one divalent bridging group has the general structure

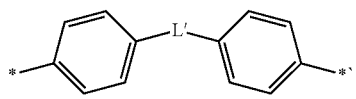

wherein L' is a divalent linking group selected from the group consisting of $-SO_2-$, $-N(R')-$, $-N(H)-$, $-CF_2-$, $-C(CF_3)_2-$, $-R''-$, and combinations thereof, wherein R' and R'' are independently selected from the group consisting of methyl, ethyl, propyl, isopropyl, phenyl, and combinations thereof.

5. The polyoctatriazacane of claim 3, wherein L' is $-SO_2-$.

6. The polyoctatriazacane of claim 3, wherein L' is $-N(R')-$, and R' is selected from the group consisting of methyl, ethyl, propyl, isopropyl, phenyl, and combinations thereof.

7. The polyoctatriazacane of claim 3, wherein L' is a linear hydrocarbyl group having from 1 to 4 carbon atoms.

8. The polyoctatriazacane of claim 2, wherein at least one of $R^1$, $R^2$, $R^3$, and $R^4$ is a fluoromethyl group having 1 to 3 fluorine atoms.

9. The polyoctatriazacane of claim 1, wherein the polyoctatriazacane further comprises a monovalent aromatic group (diluent group) selected from the group consisting of:

formula (8):

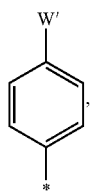
(8)

formula (9):

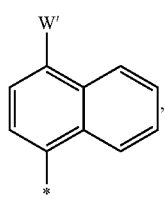
(9)

formula (10):

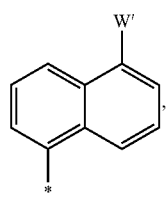
(10)

formula (11):

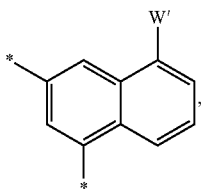
(11)

and combinations thereof, wherein W' is a monovalent radical selected from the group consisting of $-N(R^1)(R^2)$, $-OR^3$, $-SR^4$, wherein $R^1$, $R^2$, $R^3$, and $R^4$ are monovalent radicals independently comprising at least 1 carbon, and the starred bond in each of formulas (8), (9), (10) and (11) is linked to a nitrogen of a hexahydrotriazine group of the PHT.

10. The polyoctatriazacane of claim 9, wherein the diluent group is:

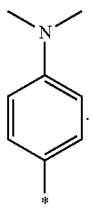

* * * * *